United States Patent
Zhang et al.

(10) Patent No.: US 12,529,124 B2
(45) Date of Patent: Jan. 20, 2026

(54) LOW-SILICON AND LOW-CARBON EQUIVALENT GPA GRADE MULTI-PHASE STEEL PLATE/STEEL STRIP AND MANUFACTURING METHOD THEREFOR

(71) Applicant: BAOSHAN IRON & STEEL CO., LTD., Shanghai (CN)

(72) Inventors: Hanlong Zhang, Shanghai (CN); Yiqiang Sun, Shanghai (CN); Xinping Mao, Shanghai (CN); Cheng Wang, Shanghai (CN); Yulong Zhang, Shanghai (CN); Xinyan Jin, Shanghai (CN); Shuize Wang, Shanghai (CN); Li Wang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 746 days.

(21) Appl. No.: 17/789,204

(22) PCT Filed: Dec. 30, 2020

(86) PCT No.: PCT/CN2020/141310
§ 371 (c)(1),
(2) Date: Jun. 26, 2022

(87) PCT Pub. No.: WO2021/136355
PCT Pub. Date: Jul. 8, 2021

(65) Prior Publication Data
US 2023/0049380 A1 Feb. 16, 2023

(30) Foreign Application Priority Data
Dec. 31, 2019 (CN) .......................... 201911415229.0

(51) Int. Cl.
*C21D 9/52* (2006.01)
*C21D 6/00* (2006.01)
(Continued)

(52) U.S. Cl.
CPC ............... *C21D 9/52* (2013.01); *C21D 6/002* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS

| 8,888,933 B2 * | 11/2014 | Hayashi | ............... C23C 2/022 |
| | | | 148/330 |
| 2010/0132849 A1 * | 6/2010 | Takagi | ................. C23C 2/02 |
| | | | 148/330 |
| 2020/0080167 A1 * | 3/2020 | Kim | ................. C22C 38/02 |

FOREIGN PATENT DOCUMENTS

CN 105950998 A 9/2016
CN 108642379 A 10/2018
(Continued)

OTHER PUBLICATIONS

International Search Report for PCT/CN2020/141310 darted Mar. 30, 2021.
(Continued)

*Primary Examiner* — Xiaowei Su
(74) *Attorney, Agent, or Firm* — Lei Fang, Esq.; Smith Tempel Blaha LLC

(57) ABSTRACT

Disclosed are a low-silicon and low-carbon equivalent GPa grade multi-phase steel plate/steel strip and a manufacturing method therefor. The steel plate/steel strip comprises the following components in percentages by weight: 0.03-0.07% of C, 0.1-0.5% of Si, 1.7-2.0% of Mn, P≤0.02%, S≤0.01%, N≤0.01%, 0.01-0.05% of Al, 0.4-0.7% of Cr, 0.001-0.005% of B, and 0.07-0.15% of Ti, and also comprises one or both of 0.15-0.4% of Mo or 0.02-0.08% of Nb, with the balance being Fe and other inevitable impurities;
(Continued)

and at the same time, the steel plate/steel strip satisfies: the content of available B*≥0.001, the content of available B*=B-[Ti-3.4N-1.2(C-Nb/7.8)]/22, CE<0.58, and CE=C+Mn/6+(Cr+Mo+V)/5+(Si+Ni+Cu)/15. The steel plate has a tensile strength of ≥980 MPa and a yield strength of ≥780 MPa, and a hole expansion rate of >50% if an original hole is a punched hole or a hole expansion rate of >60% if the original hole is a reamed hole.

14 Claims, 2 Drawing Sheets

(51) Int. Cl.

| | |
|---|---|
| *C21D 8/02* | (2006.01) |
| *C21D 9/46* | (2006.01) |
| *C22C 38/00* | (2006.01) |
| *C22C 38/02* | (2006.01) |
| *C22C 38/06* | (2006.01) |
| *C22C 38/22* | (2006.01) |
| *C22C 38/26* | (2006.01) |
| *C22C 38/28* | (2006.01) |
| *C22C 38/32* | (2006.01) |
| *C22C 38/38* | (2006.01) |
| *C23C 2/02* | (2006.01) |
| *C23C 2/06* | (2006.01) |
| *C23C 2/40* | (2006.01) |

(52) U.S. Cl.
CPC ......... *C21D 8/0205* (2013.01); *C21D 8/0226* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/06* (2013.01); *C22C 38/22* (2013.01); *C22C 38/26* (2013.01); *C22C 38/28* (2013.01); *C22C 38/32* (2013.01); *C22C 38/38* (2013.01); *C23C 2/022* (2022.08); *C23C 2/06* (2013.01); *C23C 2/40* (2013.01); *C21D 2211/002* (2013.01); *C21D 2211/005* (2013.01)

(56) References Cited

FOREIGN PATENT DOCUMENTS

| | | |
|---|---|---|
| CN | 109023036 A | 12/2018 |
| CN | 109642292 A | 4/2019 |
| CN | 110506134 A | 11/2019 |
| JP | 2007046096 A | 2/2007 |
| JP | 2007284712 A | 11/2007 |
| JP | 2014051726 A | 3/2014 |

OTHER PUBLICATIONS

International Written Opinion for PCT/CN2020/141310 dated Mar. 30, 2021.

* cited by examiner

LOW-SILICON AND LOW-CARBON EQUIVALENT GPA GRADE MULTI-PHASE STEEL PLATE/STEEL STRIP AND MANUFACTURING METHOD THEREFOR

CROSS-REFERENCE TO RELATED APPLICATIONS

This application is a 371 U.S. National Phase of PCT International Application No. PCT/CN2020/141310 filed on Dec. 30, 2020, which claims benefit and priority to Chinese patent application No. CN201911415229.0 filed on Dec. 31, 2019, the contents of each of the above listed applications are incorporated by reference herein in their entiries.

TECHNICAL FIELD

The present disclosure belongs to metal material field, in particular relates to a low-carbon equivalent GPa grade multiphase steel plate/steel strip and a manufacturing method therefor, which is mainly used in the manufacture of products for automotive chassis and suspension systems.

BACKGROUND ART

The "light weighting" of automobiles can directly reduce emissions and reduce fuel consumption, which is the goal of today's automobile manufacturing industry. One important measure of "light weighting" of automobiles is the use of high-strength and ultra-high-strength steel plates instead of low-strength steel plates. At present, the concept of "light weighting" is further applied to automotive chassis and suspension systems, and automotive chassis materials are also required to adopt high-strength steel to achieve "light weighting" with increasingly stringent environmental requirements and market demands.

However, in addition to higher strength of the steel plate, it is also required for the structural parts of the automobile chassis and suspension system that the steel plates have good hole-expansion performance, surface plating performance and welding performance. Therefore, the multiphase steel having ferrite, bainite and carbide precipitation as the main structure has become the commonly used steel grade for automobile chassis and suspension system parts due to its high strength and good hole expansion performance. However, the strength of the common multiphase steels in the current market generally cannot reach the GPa level. Most of the multiphase steels have a yield strength of 600-700 MPa and a tensile strength of 700-900 MPa in the published patents. Since a certain amount of ferrite and bainite is required in the multiphase steel structure to provide high hole expansion performance (the strength of these two structures is lower than that of martensite), it is difficult to further increase the strength of the multiphase steel to GPa level.

At present, there are two common methods to improve the tensile strength of multiphase steel to GPa level (that is, the tensile strength is ≥980 MPa). One method is to introduce a large amount of carbon, silicon and manganese, especially silicon, into the steel to change the structure of the multiphase steel, thereby introducing martensite or retained austenite to increase strength. Another method is to add large amounts of other alloying elements to increase strength. However, the introduction of a large amount of silicon will deteriorate the surface quality of the steel plate, and the introduction of a large amount of other alloying elements will greatly increase the cost of the steel plate. In addition, these two methods greatly increase the carbon equivalent level of the steel plate. However, compared with body parts, the structure of automotive chassis parts is complex, so that various welding processes, such as argon shielded welding, laser welding, spot welding, etc., are required. Thus, there are higher requirements for the carbon equivalent level of steel. There is a technical contradiction between the development of the GPa grade multiphase steel for chassis and the control of the low-cost low-carbon equivalent level of the steel plate, which cannot be achieved in the published patents.

For example, the Chinese patent publication CN101400816A makes the steel reach the GPa strength level by adding a large amount of precious alloying elements such as Ni and Cu, etc. But this method increases not only the alloy cost of the steel, but also the carbon equivalent level of the steel. In addition, more than 0.50% silicon is added in most examples in this patent.

According to Yang Yu, Chang Wang, Lin Wang, et al., "Research on defects of red iron scale on Si-containing steel based on high temperature oxidation characteristics [J]", Rolling Steel, 2016, 33(2): 10-15; and "Research on the effect of Si element on the interface microstructure of oxide scale forming in the heating furnace [J]", Rolling Steel, 2016, 33(5): 6-10, when the silicon content in the steel is high, defects such as red scales (red rust, tiger winkle defect, etc.) can be formed and thus the surface quality of the steel is reduced. Among them, automotive steel containing 0.5% silicon content was found to have an equally spaced strip of iron scale on the surface of the strip steel, and defects such as red rust and tiger winkle defect accounted for about 30% of the strip steel surface. This surface condition cannot be used to prepare automotive part products that are extremely demanding on surface appearance and color. In the only inventive example in which the silicon content can meet the requirements of automotive steel products disclosed in this patent, the carbon equivalent is as high as 0.73 or more, let alone the high alloy cost brought about by the addition of high Cu and high Ni. Therefore, the products involved in this patent cannot be used to manufacture multiphase steel products for GPa grade automotive chassis with low-cost, low-carbon equivalents that are urgently needed in the market.

Similarly, the Chinese patent applications CN201710022118.8 and CN201180067938.X have designed a multiphase steel product that reaches the GPa level. Although no precious Ni and Cu alloy elements are added in these two patents, the silicon content is above 0.5%, and the carbon equivalent level is high, so that it cannot be used to prepare automotive part products that have extremely harsh requirements on surface appearance and color and carbon equivalent and it will not be repeated herein.

Chinese patent application CN201380022062.6 discloses a GPa grade multiphase steel product containing no surface tabby defects (i.e., surface red scale defects mentioned in the present disclosure) with low silicon composition design. However, according to the carbon equivalent formula $CE=C+Mn/6+(Cr+Mo+V)/5+(Si+Ni+Cu)/15$ published by American Society for Metals, the carbon equivalent of the product in this patent is higher than 0.60 or more, and the hole expansion ratio performance of the product is not evaluated in this patent.

Therefore, the existing technology cannot solve the contradiction between the tensile strength of the GPa grade and the low silicon low carbon equivalent (i.e. surface quality and weldability) of the multiphase steel products for automotive chassis. It is a problem in today's steel industry and an urgent need in the current automotive industry to obtain a GPa grade multiphase steel plate/steel strip with a combination of GPa grade strength, high hole expansion and high weldability to meet the production and manufacturing requirement of automotive chassis structural components.

SUMMARY

One object of the present disclosure is to provide a low silicon low-carbon equivalent GPa grade multiphase steel plate/steel strip and a manufacturing method therefor, wherein the steel plate has a tensile strength of ≥980 MPa, a yield strength of ≥780 MPa, a hole expansion ratio which satisfies: if the initial hole is a punched hole, the hole expansion ratio is >50%; if the initial hole is a reamed hole, the hole expansion ratio is >60%. The low silicon low-carbon equivalent GPa grade multiphase steel plate/steel strip is suitable for the manufacture of automotive chassis and suspension system parts.

To achieve the above object, the technical solution of the present disclosure is as follows:

A low silicon low-carbon equivalent GPa grade multiphase steel plate/steel strip comprises the following chemical elements in weight percentages: C: 0.03-0.07%, Si: 0.1-0.5%, Mn: 1.7-2.0%, P≤0.02%, S≤0.01%, N≤0.01%, Al: 0.01-0.05%, Cr: 0.4-0.7%, B: 0.001-0.005%, Ti: 0.07-0.15%, and further comprises Mo: 0.15-0.4%, and/or Nb: 0.02-0.08%, and a balance of Fe and unavoidable impurities; at the same time, it is required to satisfy:

an effective content of $B^* \geq 0.001$, the effective content of $B^*=B-[Ti-3.4N-1.2(C-Nb/7.8)]/22$;

$$CE<0.58, CE=C+Mn/6+(Cr+Mo+V)/5+(Si+Ni+Cu)/15.$$

Preferably, the C content is 0.045-0.06%, in weight percentage.

Preferably, the Si content is 0.15-0.27%, in weight percentage.

Preferably, the B content is 0.002-0.004%, in weight percentage.

The microstructure of the steel plate/steel strip of the present disclosure contains ferrite and lower bainite, as well as a small amount of carbide precipitation phase, other inclusion phase and/or trace martensite phase, wherein the content of ferrite is ≤20%, and the content of ferrite+lower bainite is ≥95%, in volume percentage.

Preferably, the microstructure of the steel plate/steel strip further contains TiN particles, and a single particle has the longest side length of <8 μm or an area of <50 μm².

Preferably, the average diameter of ferrite grains is <6 μm, or a grain size ASTM rating of ferrite grains is >11.8.

The manufacturing method for the low silicon low-carbon equivalent GPa grade multiphase steel plate/steel strip according to the present disclosure comprises the following steps:

1) Smelting, continuous casting
   wherein the above chemical composition is smelt and cast into a slab by continuous casting, wherein a cooling rate of the slab is ≥5° C./s during continuous casting;
2) Slab hot transferring, rolling
   wherein the slab enters the furnace at a temperature of not less than 700° C., and the slab is heated at a heating temperature of 1100-1250° C.; wherein each reduction rate for the first two passes of hot rolling is ≥55%, and a final rolling temperature of finish rolling is 850-950° C.;
3) Cooling after rolling, coiling
   wherein water cooling is performed after rolling, and the coiling temperature is 550-630° C.;
4) Pickling.

Further, after the step 3) pickling, the method further comprises the hot dip galvanizing annealing process to obtain the finished hot-rolled hot-dip galvanized steel plate.

Preferably, the thickness of the steel plate/steel strip is 0.7 to 4.0 mm.

The component of the steel according to the present disclosure is designed as follows:

Carbon (C): Carbon directly affects the strength, weldability, and formability of the steel plates/steel strips. The higher the carbon content, the more conducive it is to increase the strength of the steel plate. If the carbon content is lower than 0.03%, the strength of the steel plate/steel strip cannot meet the target requirements; if the carbon content is higher than 0.07%, it is easy to cause excessively high carbon equivalent and deteriorate the weldability of steel plates. Thus, the carbon content according to the present disclosure is controlled to be from 0.03 to 0.07%.

Silicon (Si): Silicon has a certain solid solution strengthening effect. The higher the Si content, the more conducive it is to improve the strength of the steel plate/steel strip. But when the silicon content is higher than 0.5%, it is prone to generate serious hot rolled iron oxide scale on the surface of hot-rolled steel plate/steel strip, which not only worsens the surface quality of the steel plate/steel strip, which is not conducive to the production of hot-dip galvanized steel plate/steel strip, but also damages the platability of the steel plate/steel strip. Therefore, the silicon content according to the present disclosure is controlled to be from 0.1 to 0.5%.

Manganese (Mn): since manganese can effectively enhance the strength of steel plate/steel strip, and the cost is relatively low relative to other alloying elements, manganese is used as the principal added element in the present disclosure. However, when the manganese content is higher than 2.0%, martensite forms in the structure, which will damage the hole expansion performance; when the manganese content is less than 1.70%, the strength of the steel plate/steel strip is insufficient. Therefore, the manganese content according to the present disclosure is controlled to be from 1.7 to 2.0%.

Aluminum (Al): Aluminum is added as the main deoxidizer in the steelmaking process. But when the aluminum content is less than 0.01%, the de-oxidation effect is insufficient; when the aluminum content exceeds 0.05%, the viscosity of the molten steel is affected, which may cause nodules in the water nozzle and damage the welding performance of the steel plate/steel strip. Therefore, the aluminum content according to the present disclosure is controlled to be from 0.01 to 0.05%.

Chromium (Cr): Chromium is conducive to expanding the bainite phase region, ensuring that the bainite structure can be obtained in cooling the steel plate/steel strip after rolling, which is conducive to improving the strength and the hole expansion ratio. However, when the added amount exceeds 0.7%, the strength increase is no longer significant, and it is not conducive to the weldability of the steel plate/steel strip. However, when the content is less than 0.4%, the expansion of the bainite phase region is not significant. Therefore, the chromium and molybdenum content according to the present disclosure is controlled to be from 0.4 to 0.7%.

Titanium, niobium and molybdenum (Ti, Nb, Mo): Titanium, niobium and molybdenum are the main alloying elements in the multiphase steel of the present disclosure, which enhances the strength of the multiphase steel by second phase strengthening after the formation of a fine carbide. The Nb element in the three has a stronger carbide formation capacity. If the addition of micro-alloying elements is insufficient, the strength of the steel plate cannot meet the design requirements. In addition, Ti element will also form TiN particles with the N element in the steel, and the oversized TiN will adversely affect the hole expansion. The Ti element also forms titanium boride with B element in steel, reducing the effective boron content in steel. When the microalloy content is low, the strength of the steel plate/steel strip is insufficient. In addition, the TiN particle size must be controlled to ensure that a single particle has the longest side length of <8 μm or an area of <50 μm$^2$, thereby avoiding coarse TiN particles that damage the hole expansion of the steel plate.

Boron (B): Boron is conducive to expanding the bainite phase region, ensuring that the steel plate/steel strip can obtain bainite structure during cooling after rolling, and the strength and hardness of the steel are significantly improved. However, too much B element will lead to too much martensitic structure in the steel plate, resulting in a decrease in the elongation and the hole expansion ratio of the steel. In addition, the B element in steel that is really conducive to expanding the bainite phase region is an effective B element that does not combine with Ti, N and other elements to form a boride, and the influence of the effective B element is calculated according to the following formula:

$$B^* = B - [Ti - 3.4N - 1.2(C - Nb/7.8)]/22 \geq 0.001.$$

The upper limit of impurity elements in steel is controlled at P≤0.02%, S≤0.01%, N≤0.01%, and the purer the steel, the better the effect.

The microstructure of the steel plate/steel strip of the present disclosure is a microstructure of ferrite+lower bainite, wherein the ferrite content is ≤20%. The content of ferrite+lower bainite is ≥95%. If the ferrite structure is higher than 20%, the steel plate/steel strip will not be able to provide the required strength; if the ferrite+lower bainite content is less than 95%, the hole expansion performance of the steel plate/steel strip will not meet the requirements. The microstructure of the steel plate/steel strip of the present disclosure may also contain a small amount of carbide precipitation phase (for example, 5% or less), a trace martensite phase (for example, 0.5% or less), or an infinitesimal other inclusion phase (0.01% or less, occasionally found in the visible field). The other inclusion phase may be common inclusions in steels such as MnS, TiN and AlN.

In the microstructure of the steel plate/steel strip according to the present disclosure, the average diameter of the ferrite grain is <6 μm, or the grain size ASTM rating is >11.8. If the average grain diameter is not less than 6 μm or the grain size rating is not greater than 11.8, the steel plate/steel strip will not be able to provide the required strength.

In addition, the measurement relationship between the above alloying elements and carbon elements should also meet the following carbon equivalent calculation formula: CE=C+Mn/6+(Cr+Mo+V)/5+(Si+Ni+Cu)/15<0.58 to ensure that the multiphase steel has low carbon equivalent level and good weldability.

In the manufacturing method according to the present disclosure:

The slab cooling rate during continuous casting will affect the grain size in the final structure of the steel plate/steel strip, the size of the inclusions formed in the liquid phase and the proportion of columnar crystals in the slab structure. If the cooling rate is lower than 5° C./s, on the one hand, the thickness or proportion of the columnar crystals in the slab will be higher than the design requirements, so that it is easy to form a banded structure in the subsequent finished product structure, which affects the bending properties of the steel plate/steel strip; on the other hand, the decrease of slab cooling rate during continuous casting will result in that the grain size in the final structure cannot meet the design requirement, and will lead to the coarse size of the inclusions (typically such as TiN) generated in the liquid phase in the steel, which is adverse to hole expansion and bending performance.

The minimum temperature before the slab enters the heating furnace will affect the final properties of the product. When the minimum temperature before the slab enters the heating furnace is less than 700° C., titanium carbide will precipitate in the slab in large quantities, and in the subsequent reheating process, the titanium carbide that has been precipitated in the slab cannot be completely re-dissolved into the slab, resulting in less sosoloid titanium and titanium carbide in the matrix after hot rolling and insufficient product strength. When the final rolling temperature of finish rolling is less than 850° C., there will be ferrite precipitation before finish rolling, resulting in a low bainite content in the final structure, so that the steel plate/steel strip cannot reach the set strength. However, considering the slab heating temperature, the final rolling temperature of finish rolling should not exceed 950° C. In addition, in the above step 2), in order to ensure that the steel plate/steel strip has a fine and highly uniform structure, each reduction rate for the first and second pass of hot rolling is ≥55%; when the reduction rate is insufficient, it is impossible to obtain fine and uniform structure, resulting in insufficient strength of the steel plate/steel strip. Not only that, the high reduction rate in the above step 2) must be cooperated with the high cooling rate of the slab during continuous casting in step 1). If the cooling rate of continuous casting cannot reach 5° C./s or more, the inclusions (mainly TiN) generated in the liquid phase in the slab will be too large; at this time, if a large reduction rate of ≥55% is used in step 2), it will lead to the cracking of coarse TiN, as shown in FIG. 1, thus becoming the source of cracks inside the steel plate/steel strip and resulting in the deterioration of the hole expansion property of the steel plate/steel strip. However, if the cooling rate of continuous casting can reach 5° C./s or more, the inclusions (mainly TiN) generated in the liquid phase in the slab are small in size, as shown in FIG. 2, and will not break at the large hot rolling reduction rate in step 2), so that it does not adversely affect the hole expansion property of the steel plate/steel strip.

The coiling temperature is one of the most critical process parameters to obtain high strength and high hole-expansion ratio. When the coiling temperature is higher than 630° C., due to the strong precipitation and coarsening of alloy carbides, it has a negative effect on the hole expansion ratio of the steel plate. On the other hand, when the coiling temperature is less than 550° C., the precipitation of carbides will be seriously inhibited, resulting in that the strength of the steel plate cannot meet the set requirements. Therefore, the coiling temperature in the present disclosure is limited to 550-630° C.

After testing, the performance of the ultra-high-strength hot-rolled steel plate/steel strip according to the present disclosure satisfies the following indices:

Mechanical properties at room temperature: a tensile strength of ≥980 MPa, preferably ≥1000 MPa; a yield strength of ≥780 MPa, preferably ≥800 MPa;

Hole expansion ratio performance if the original hole is a punched hole, the hole expansion ratio is greater than 50%, preferably ≥55%; if the original hole is a reamed hole, the hole expansion ratio is greater than 60%, preferably ≥65%.

In some embodiments, the ultra-high-strength hot-rolled steel plate/steel strip according to the present disclosure has a tensile strength of 980-1100 MPa, a yield strength of 780-900 MPa; a hole expansion ratio performance if the original hole is a punched hole, the hole expansion ratio is 55%-70%; if the original hole is a reamed hole, the hole expansion ratio is 65-80%.

The component design of low silicon and low carbon equivalent is adopted in the present disclosure to meet the requirements of surface quality and weldability of multi-phase steel for automobile chassis. First, the silicon element content is designed to be Si: 0.1-0.5%, preferably 0.1-0.4%, more preferably the silicon element content Si: 0.15-0.27%. Secondly, the carbon equivalent satisfies CE=C+Mn/6+(Cr+Mo+V)/5+(Si+Ni+Cu)/15<0.7 (carbon equivalent formula suggested by American Society for Metals), preferably <0.58.

Under the premise of low-silicon and low-carbon equivalent design, in order to ensure that the steel plate reaches the GPa strength level, in addition to adding a certain amount of alloying elements such as Mn and Cr to the steel, the distribution of micro-alloying elements B, Ti, and Nb is further optimized. Although it is known that trace B element can greatly improve the strength and hardness of the steel plate, there is no clear research on how much B element is added for multiphase steel products. In fact, the B element added to the steel will react with various alloying elements, and the most active reaction is the production of BN with the N element in the steel, but the formation of BN will greatly impair the manufacturability and final product performance of the steel plate. Therefore, some Ti element will be added to the B-containing steel to avoid the reaction between N and B by preferentially forming TiN. However, the remaining Ti element in the steel is also strong boride forming element, which will react with B element to form titanium boride. On the other hand, the Ti element will also form TiC with effective C element. Therefore, the content of effective boron element in steel depends on the content of Ti and N elements on the one hand, and is also affected by the effective carbon element on the other hand, and the latter is also affected by the content of strong carbide forming elements and even bainite. Thus, the content of effective B element in steel is affected by a combination of very complex factors. With respect to the effective B element (represented by B*) in the steel, after comprehensively considering all factors, it is proposed in the present disclosure that in order to ensure that the steel plate reaches the GPa strength level, the effective boron element should satisfy B*=B-[Ti-3.4N-1.2(C-Nb/7.8)]/22≥0.001.

Small and highly uniform structure and small-sized inclusions can be realized via the process optimization, so as to obtain excellent hole expansion performance. In one aspect, a high cooling rate design is adopted in continuous casting. On the one hand, the proportion of columnar crystals in the slab is reduced to increase the proportion of fine equiaxed crystals, and on the other hand, the size of the inclusions generated in the liquid phase (represented by TiN) is reduced. In another aspect, in the first and second passes of hot rolling, a high-reduction rolling process design is adopted to obtain a fine structure while further destroying the columnar crystals, and achieve a combination of high strength and high hole expansion ratio.

The ultra-high-strength hot-rolled steel plate/steel strip manufactured by the present disclosure has a combination of low silicon, low carbon equivalent, GPa grade high strength and high hole expansion performance. The ultra-high-strength hot-rolled steel plate/steel strip is hot-dip galvanized to obtain a finished hot-rolled hot-dip galvanized steel sheet. The ultra-high-strength hot-rolled steel plate products, steel strip products and hot-dip galvanized steel plate products can be used for the manufacture of automobile chassis and suspension system parts, achieving "light weighting" of automobiles.

BRIEF DESCRIPTIONS OF THE DRAWINGS

DETAILED DESCRIPTION

Figure 1:
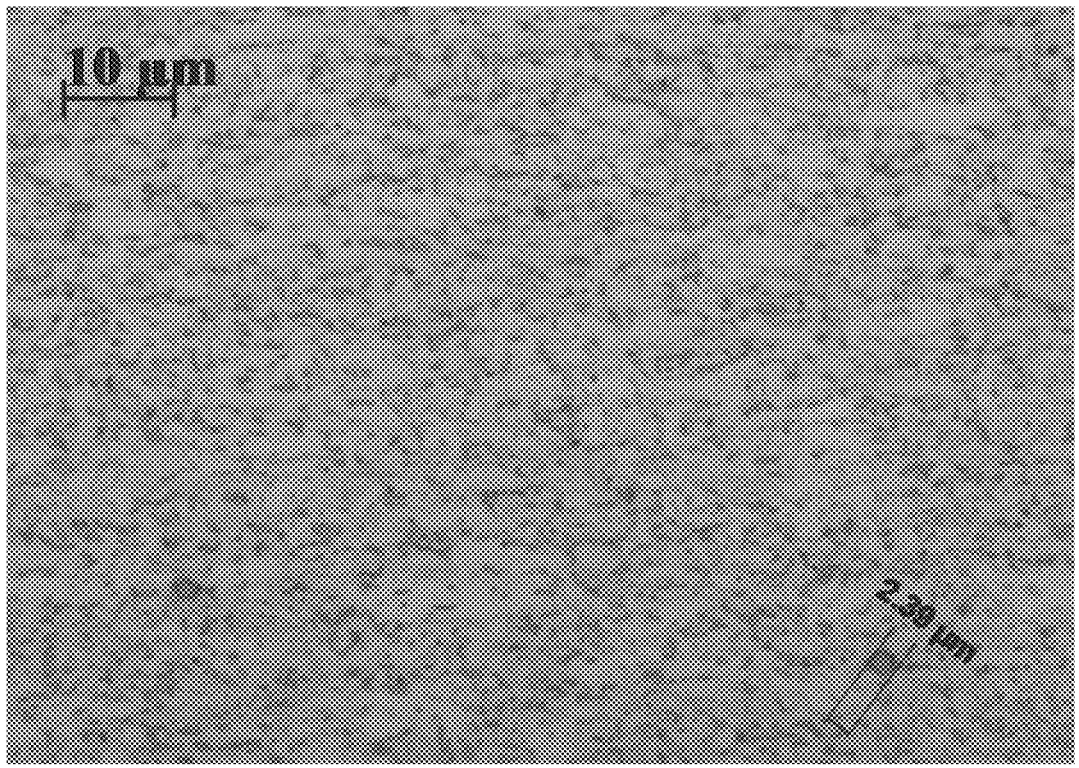
FIG. 1 shows the size of TiN particles when the cooling rate of continuous casting reaches 5° C./s or more and their morphology after hot rolling at large reduction (photograph of the structure in hot rolling state).
Figure 2:
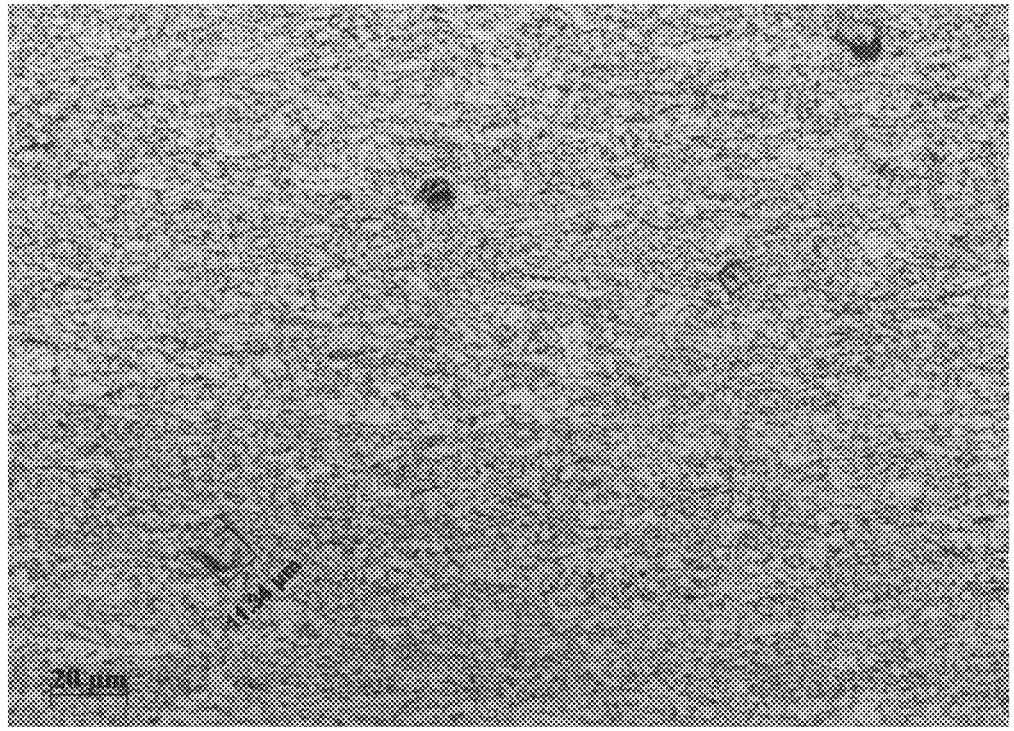
FIG. 2 shows the size of TiN particles when the cooling rate of continuous casting is less than 5° C./s and their morphology after hot rolling at large reduction (photograph of the structure in hot rolling state).

The present disclosure will be further described with reference to the following examples and figures.

The steels with different components after smelting shown in Table 1 were heated and hot rolled according to the process shown in Table 2 to obtain steel plates with a thickness of less than 4 mm. The yield strength, tensile strength and elongation were measured for tensile specimens with a gauge length of 50 mm and 5 mm along the longitudinal direction, and the hole expansion ratio and 180° bending performance were measured in the middle area of the steel plate. The test data are shown in Table 2. Among them, the hole expansion ratio is measured by the hole expansion test. The specimen with a hole in the center was pressed into a concave die with a punch, so that the center hole of the specimen was enlarged until necking or perforated cracks appear at the edge of the hole. Since the preparation method of the original hole in the center of the specimen has a great influence on the test results of the hole expansion ratio, the original holes in the center of the specimens were prepared by punching and reaming, respectively and subsequent tests were performed in accordance with the hole expansion ratio test method specified in the ISO/DIS 16630 standard.

In Table 1, Examples A-I are the steels of the present disclosure. Comparative Examples J-M are comparative steels, wherein the content of carbon or manganese or other alloying elements exceeds the scope of the composition of the present disclosure. Comparative Examples O and P use the component and process according to published patent application. Comparative Example O is an example of CN201380022062.6, of which the alloying ingredient is different from that of the present disclosure and the carbon equivalent is higher than that of the present disclosure; Comparative Example P is an example of CN201180067938.X, of which the alloying ingredient is also different from that of the present disclosure and the carbon equivalent is higher than that of the present disclosure.

Table 2 shows the different manufacturing processes of various steel grades in Table 1, which are also divided into two categories of Examples and Comparative Examples, wherein the processes of Comparative Example O and Comparative Example P are the processes disclosed in the corresponding patent applications. But Comparative Example O is a cold-rolled product that does not involve a hot-rolling process, and its product performance is the product performance after cold-rolling and annealing. Some parameters in Comparative Example P are not mentioned, and other parameters are partially different from those of the present disclosure. Table 3 lists the tested mechanical property value of the above-mentioned Examples and Comparative Examples.

It can be seen that when the content of C, Mn, Ti, Nb, B or B* deviates from the scope of the present disclosure, for example, when the content of Mn, Ti and Nb, or B* is relatively low, such as Comparative Examples K, L and N, it leads to a strength of the steel plate lower than the design requirements; and when the content of C or B is higher than the composition range of the present disclosure, such as Comparative Examples J and M, it leads to the production of a large amount of martensite in the structure, which deteriorates the hole expansion performance of the material, not meeting the purpose of the present disclosure.

Figure 3:
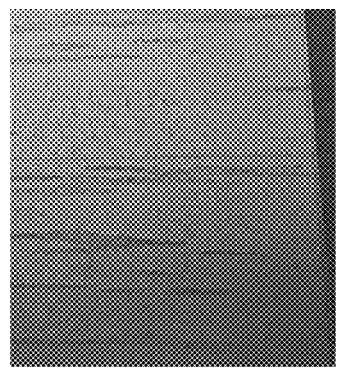
FIG. 3 is a photo of hot-rolled red iron scale (tiger winkle) defects on the surface of the strip steel when the Si element exceeds 0.5% (FIG. 3 shows that the Si content is 0.55%, Comparative Example L).
Figure 4:
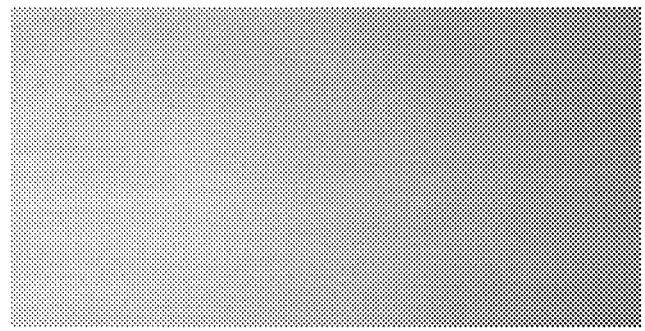
FIG. 4 is a photo of the surface of the strip steel when the Si element is less than 0.5% (FIG. 4 shows that the Si content is 0.25%, Example C).
Figure 5:
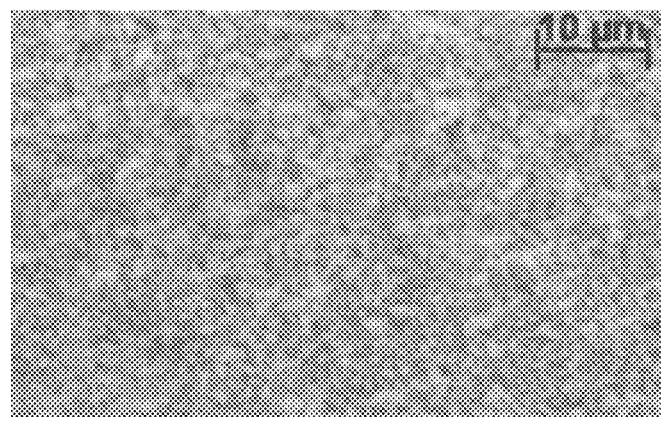
FIG. 5 shows that in the microstructure of the steel plate/steel strip of the present disclosure, the content of ferrite+lower bainite is ≥95%.

When the Si element content is higher than the scope of the present disclosure, such as Comparative Example L, serious red iron scale (tiger winkle) defects appears on the surface of the steel plate after hot rolling and pickling, as shown in FIG. 3; and when the Si element is within the scope of the present disclosure, the surface of the steel plate is normal in color after hot rolling and pickling, such as Example C as shown in FIG. 4.

When the temperature of the slab entering the furnace is too low, such as Comparative Steel A-2, the strength does not meet the design standards of the present disclosure; when the coiling temperature is too high, such as Comparative Example D-2, a large amount of coarse carbide particles are generated in the steel plate after coiling, which deteriorates the elongation and hole expansion performance. When the reduction rate of the first two passes of hot rolling is not sufficient, the banded structure of the steel plate cannot be completely eliminated, and the grains cannot be fully refined to achieve the uniformity of the structure, which leads to the deterioration of the elongation and hole expansion performance of the steel plate, such as Comparative Example B-2. When the cooling rate of continuous casting is not sufficient, but a large reduction rate is pursued in hot rolling, the coarse TiN particles in the steel are broken and a potential crack source is formed, which greatly deteriorates the elongation and hole expansion performance of the material, such as Comparative Example C-2.

Based on the above, the present disclosure adopts the design with low silicon and low carbon equivalent and optimizes the ratio of each element by reasonably designing the content range of effective B element on the basis of carbon-manganese steel. By further increasing the cooling rate in continuous casting, the hot rolling reduction rate, and the coiling temperature on the basis of the conventional automobile steel production line, the present disclosure produces a GPa grade ultra-high-strength hot-rolled steel plate/steel strip with a combination of high strength, high hole expansion performance, excellent surface quality and weldability performance, which has a yield strength of not less than 780 MPa, a tensile strength of not less than 980 MPa, and a hole expansion ratio of larger than 50% (the original hole is punched) or larger than 60% (the original hole is reamed), to make up for the urgent demand of the automotive industry market for chassis and suspension materials with a combination of ultra-high strength, high hole expansion performance and low carbon equivalent.

TABLE 1

(unit: percentage)

| Steel No. | C | Si | Mn | P | S | N | Al | Cr | Ti | Mo | Nb | B | CE | B* |
|---|---|---|---|---|---|---|---|---|---|---|---|---|---|---|
| Ex. A | 0.059 | 0.30 | 1.88 | 0.012 | 0.002 | 0.004 | 0.02 | 0.53 | 0.081 | 0.32 | 0.05 | 0.0015 | 0.562 | 0.0013 |
| Ex. B | 0.040 | 0.45 | 1.98 | 0.013 | 0.004 | 0.003 | 0.01 | 0.66 | 0.113 | 0.18 | 0.02 | 0.0045 | 0.568 | 0.0019 |
| Ex. C | 0.069 | 0.25 | 1.8 | 0.015 | 0.003 | 0.005 | 0.02 | 0.44 | 0.141 | 0.37 | 0.02 | 0.0031 | 0.548 | 0.0011 |
| Ex. D | 0.054 | 0.36 | 1.75 | 0.014 | 0.001 | 0.005 | 0.04 | 0.58 | 0.090 | 0.22 | 0.06 | 0.0020 | 0.530 | 0.0012 |
| Ex. E | 0.048 | 0.15 | 1.85 | 0.010 | 0.001 | 0.004 | 0.01 | 0.69 | 0.104 | 0.28 | 0.04 | 0.0035 | 0.560 | 0.0017 |
| Ex. F | 0.033 | 0.42 | 1.94 | 0.008 | 0.005 | 0.002 | 0.03 | 0.42 | 0.075 | 0.25 | 0.07 | 0.0043 | 0.518 | 0.0025 |
| Ex. G | 0.037 | 0.33 | 1.73 | 0.011 | 0.001 | 0.007 | 0.02 | 0.47 | 0.121 | 0.39 | 0.07 | 0.0040 | 0.519 | 0.0011 |
| Ex. H | 0.065 | 0.18 | 1.77 | 0.009 | 0.006 | 0.006 | 0.04 | 0.50 | 0.131 | 0.35 | 0.03 | 0.0037 | 0.542 | 0.0020 |
| Ex. I | 0.051 | 0.20 | 1.83 | 0.016 | 0.007 | 0.006 | 0.01 | 0.62 | 0.097 | 0.16 | 0.03 | 0.0025 | 0.525 | 0.0016 |
| Comp. Ex. J | 0.075 | 0.23 | 1.75 | 0.012 | 0.002 | 0.005 | 0.03 | 0.44 | 0.092 | 0.19 | 0.05 | 0.0044 | 0.472 | 0.0020 |
| Comp. Ex. K | 0.062 | 0.47 | 1.56 | 0.015 | 0.001 | 0.005 | 0.04 | 0.42 | 0.084 | 0.35 | 0.05 | 0.002 | 0.497 | 0.0022 |
| Comp. Ex. L | 0.051 | 0.55 | 1.86 | 0.01 | 0.001 | 0.003 | 0.03 | 0.5 | 0.061 | 0.35 | 0.01 | 0.0022 | 0.568 | 0.0026 |
| Comp. Ex. M | 0.042 | 0.25 | 1.96 | 0.01 | 0.002 | 0.005 | 0.03 | 0.47 | 0.09 | 0.32 | 0.04 | 0.0071 | 0.543 | 0.0053 |
| Comp. Ex. N | 0.045 | 0.22 | 1.93 | 0.01 | 0.001 | 0.005 | 0.01 | 0.55 | 0.135 | 0.29 | 0.03 | 0.0039 | 0.549 | 0.0008 |
| Comp. Ex. O | 0.14 | 0.06 | 2.29 | 0.001 | 0.0012 | 0.001 | 0.292 | 0.54 | 0.029 | 0 | 0 | 0.0015 | 0.634 | 0.0080 |
| Comp. Ex. P | 0.16 | 0.86 | 2.05 | Not disclosed | Not disclosed | 0.004 | 0.033 | 0.33 | 0.12 | 0 | 0 | 0.002 | 0.625 | 0.0059 |

TABLE 2

| Steel No. | Continuous cast cooling rate °C./s | Temperature of slab entering into furnace in hot rolling °C. | Reheating temperature °C. | Reduction rate of the first pass % | Reduction rate of the second pass % | Finish rolling temperature °C. | Coiling temperature °C. |
|---|---|---|---|---|---|---|---|
| Ex. A-1 | 12 | 720 | 1200 | 55 | 57 | 910 | 590 |
| Comp. Ex. A-2 | 10 | 580 | 1200 | 56 | 57 | 890 | 600 |
| Ex. B-1 | 15 | 800 | 1220 | 58 | 58 | 900 | 610 |
| Comp. Ex. B-2 | 10 | 780 | 1220 | 45 | 40 | 880 | 615 |
| Ex. C-1 | 10 | 770 | 1210 | 57 | 58 | 870 | 570 |
| Comp. Ex. C-2 | 1 | 780 | 1210 | 57 | 57 | 920 | 575 |
| Ex. D-1 | 13 | 750 | 1230 | 60 | 59 | 930 | 580 |
| Comp. Ex. D-2 | 10 | 750 | 1200 | 58 | 58 | 860 | 640 |
| Ex. E | 11 | 790 | 1240 | 61 | 55 | 925 | 620 |
| Ex. F | 17 | 730 | 1190 | 65 | 55 | 875 | 605 |
| Ex. G | 20 | 810 | 1180 | 57 | 56 | 850 | 595 |
| Ex. H | 16 | 780 | 1250 | 58 | 59 | 940 | 560 |
| Ex. I | 14 | 740 | 1215 | 60 | 60 | 915 | 585 |
| Comp. Ex. J | 15 | 730 | 1200 | 58 | 57 | 890 | 600 |
| Comp. Ex. K | 14 | 720 | 1200 | 55 | 55 | 910 | 590 |
| Comp. Ex. L | 13 | 760 | 1230 | 57 | 55 | 900 | 610 |
| Comp. Ex. M | 10 | 720 | 1210 | 55 | 57 | 910 | 600 |
| Comp. Ex. N | 15 | 710 | 1210 | 60 | 55 | 900 | 610 |
| Comp. Ex. O | Not disclosed | Not disclosed | Not disclosed | Not disclosed | Not disclosed | Not disclosed | Not disclosed |
| Comp. Ex. P | Not disclosed | Not disclosed | 1260 | 900 | Not disclosed | Not disclosed | 500 |

TABLE 3

| Steel No. | Yield strength, MPa | Tensile strength, MPa | A50% | Hole expansion ratio (punched hole), % | Hole expansion ratio (reamed hole), % |
|---|---|---|---|---|---|
| Ex. A-1 | 799 | 1011 | 11.3 | 63 | 76 |
| Comp. Ex. A-2 | 723 | 942 | 14 | 79 | 92 |
| Ex. B-1 | 827 | 1039 | 10.8 | 57 | 71 |
| Comp. Ex. B-2 | 800 | 1015 | 11.1 | 43 | 55 |
| Ex. C-1 | 884 | 1097 | 10.2 | 55 | 69 |
| Comp. Ex. C-2 | 832 | 1054 | 7.7 | 37 | 48 |
| Ex. D-1 | 785 | 992 | 12.1 | 66 | 79 |
| Comp. Ex. D-2 | 811 | 1046 | 10.0 | 47 | 58 |
| Ex. E | 839 | 1025 | 10.6 | 61 | 76 |
| Ex. F | 802 | 1040 | 10.9 | 56 | 67 |
| Ex. G | 812 | 1012 | 10.6 | 59 | 70 |
| Ex. H | 891 | 1066 | 10.1 | 55 | 65 |
| Ex. I | 765 | 1012 | 11.3 | 60 | 72 |
| Comp. Ex. J | 893 | 1087 | 9.5 | 44 | 61 |
| Comp. Ex. K | 711 | 922 | 15 | 73 | 90 |
| Comp. Ex. L | 696 | 877 | 16.5 | 80 | 95 |
| Comp. Ex. M | 902 | 1103 | 8.1 | 39 | 52 |
| Comp. Ex. N | 752 | 966 | 12.3 | 68 | 84 |
| Comp. Ex. O | 748 | 1094 | 6.1(A80) | Not disclosed | Not disclosed |
| Comp. Ex. P | 825 | 1203 | 9.6(A80) | Not disclosed | Not disclosed |

What is claimed is:

1. A low silicon low carbon equivalent multiphase steel plate/steel strip, comprising the following chemical elements by weight percentage: C: 0.03-0.07%, Si: 0.1-0.5%, Mn: 1.7-2.0%, P≤0.02%, S≤0.01%, N≤0.01%, Al: 0.01-0.05%, Cr: 0.4-0.7%, B: 0.001-0.005%, Ti: 0.07-0.15%, and further comprising Mo: 0.15-0.4%, and/or Nb: 0.02-0.08%, and a balance of Fe and other unavoidable impurities; at the same time, it satisfies:

an effective content of B*≥0.001, the effective content of B*=B-[Ti-3.4N-1.2(C-Nb/7.8)]/22;

CE<0.58, CE=C+Mn/6+(Cr+Mo+V)/5+(Si+Ni+Cu)/15;

wherein the microstructure of the steel plate/steel strip contains ferrite and lower bainite, as well as 5% or less carbide precipitation phase, other inclusion phase and/or 0.5% or less martensite phase, wherein the content of ferrite is ≤20%, and the content of ferrite+lower bainite is ≥95%, in volume percentage; and wherein the steel plate/steel strip has a tensile strength of ≥980 MPa, a yield strength of ≥780 MPa; a hole expansion ratio performance satisfies that if the original hole is a punched hole, the hole expansion ratio is >50%; if the original hole is a reamed hole, the hole expansion ratio is >60%.

2. The low silicon low carbon equivalent multiphase steel plate/steel strip according to claim 1, wherein the C content is 0.045-0.06%, in weight percentage.

3. The low silicon low carbon equivalent multiphase steel plate/steel strip according to claim 1, wherein the Si content is 0.15-0.27%, in weight percentage.

4. The low silicon low carbon equivalent multiphase steel plate/steel strip according to claim 1, wherein the B content is 0.002-0.004%, in weight percentage.

5. The low silicon low carbon equivalent multiphase steel plate/steel strip according to claim 1, wherein the microstructure of the steel plate/steel strip further contains TiN particles, and a single particle has the longest side length of <8 μm or an area of <50 μm².

6. The low silicon low carbon equivalent multiphase steel plate/steel strip according to claim 1, wherein the average diameter of ferrite grains is <6 μm, or a grain size ASTM rating of ferrite grains is >11.8.

7. The manufacturing method for the low silicon low-carbon equivalent multiphase steel plate/steel strip according to claim 1, which comprises the following steps:
1) Smelting, continuous casting
wherein the chemical elements according to claim 1 is smelt and cast into a slab by continuous casting, wherein a cooling rate of the slab is ≥5° C./s during continuous casting;
2) Slab hot transferring, rolling
wherein the slab enters the furnace at a temperature of not less than 700° C., and the slab is heated at a heating temperature of 1100-1250° C.; wherein each reduction rate for the first two passes of hot rolling is ≥55%, and a final rolling temperature of finish rolling is 850-950° C.;
3) Cooling after rolling, coiling
wherein water cooling is performed after rolling, and the coiling temperature is 550-630° C.;
4) Pickling.

8. The manufacturing method according to claim 7, wherein after the step 3) pickling, the method further comprises the hot dip galvanizing annealing process to obtain the finished hot-rolled hot-dip galvanized steel plate.

9. The manufacturing method according to claim 7, wherein the thickness of the steel plate/steel strip is 0.7 to 4.0 mm.

10. The manufacturing method according to claim 7, wherein the C content of the multiphase steel plate/steel strip is 0.045-0.06%, in weight percentage.

11. The manufacturing method according to claim 7, wherein the Si content of the multiphase steel plate/steel strip is 0.15-0.27%, in weight percentage.

12. The manufacturing method according to claim 7, wherein the B content of the multiphase steel plate/steel strip is 0.002-0.004%, in weight percentage.

13. The manufacturing method according to claim 7, wherein the microstructure of the steel plate/steel strip further contains TiN particles, and a single particle has the longest side length of <8 μm or an area of <50 μm².

14. The manufacturing method according to claim 7, wherein the average diameter of ferrite grains is <6 μm, or a grain size ASTM rating of ferrite grains is >11.8.

* * * * *